United States Patent [19]

Nagamura et al.

[11] Patent Number: 5,345,773
[45] Date of Patent: Sep. 13, 1994

[54] METHOD AND APPARATUS FOR THE PRODUCTION OF ULTRA-HIGH PURITY NITROGEN

[75] Inventors: Takashi Nagamura; Takao Yamamoto, both of Hyogo, Japan

[73] Assignee: Teisan Kabushiki Kaisha, Tokyo, Japan

[21] Appl. No.: 26,480

[22] Filed: Mar. 4, 1993

[51] Int. Cl.$^5$ ............................................. F25J 3/00
[52] U.S. Cl. ........................................... 62/38; 62/41
[58] Field of Search ............................. 62/24, 39, 41

[56] References Cited

U.S. PATENT DOCUMENTS 5,006,139 4/1991 Agrawal et al. .................... 62/24
5,157,926 10/1992 Guilleminot ........................ 62/24

FOREIGN PATENT DOCUMENTS 0376465 8/1993 European Pat. Off. .

Primary Examiner—Ronald C. Capossela
Attorney, Agent, or Firm—Young & Thompson

[57] ABSTRACT

A method and apparatus for separating air by low temperature liquefaction and fractionation wherein feed air is compressed and cooled and supplied to the high pressure stage of a two-stage fractionation column from the bottom of the high pressure stage of which liquid is expanded and introduced at an intermediate level of the low pressure stage and a gaseous nitrogen product is removed from the top of the high pressure stage of the column, and wherein an oxygen product is removed from the bottom of the low pressure stage and a gaseous nitrogen product is removed from the top of the low pressure stage. Both stages contain solid material providing solid surfaces on which mass transfer takes place to effect fractionation over a substantial vertical distance. The improvement comprises removing a liquid from the high pressure stage intermediate the height of the solid material therein. The removed liquid is subcooled and expanded to produce a gas and a liquid, and the last-named liquid is withdrawn as ultra-high purity nitrogen.

13 Claims, 3 Drawing Sheets

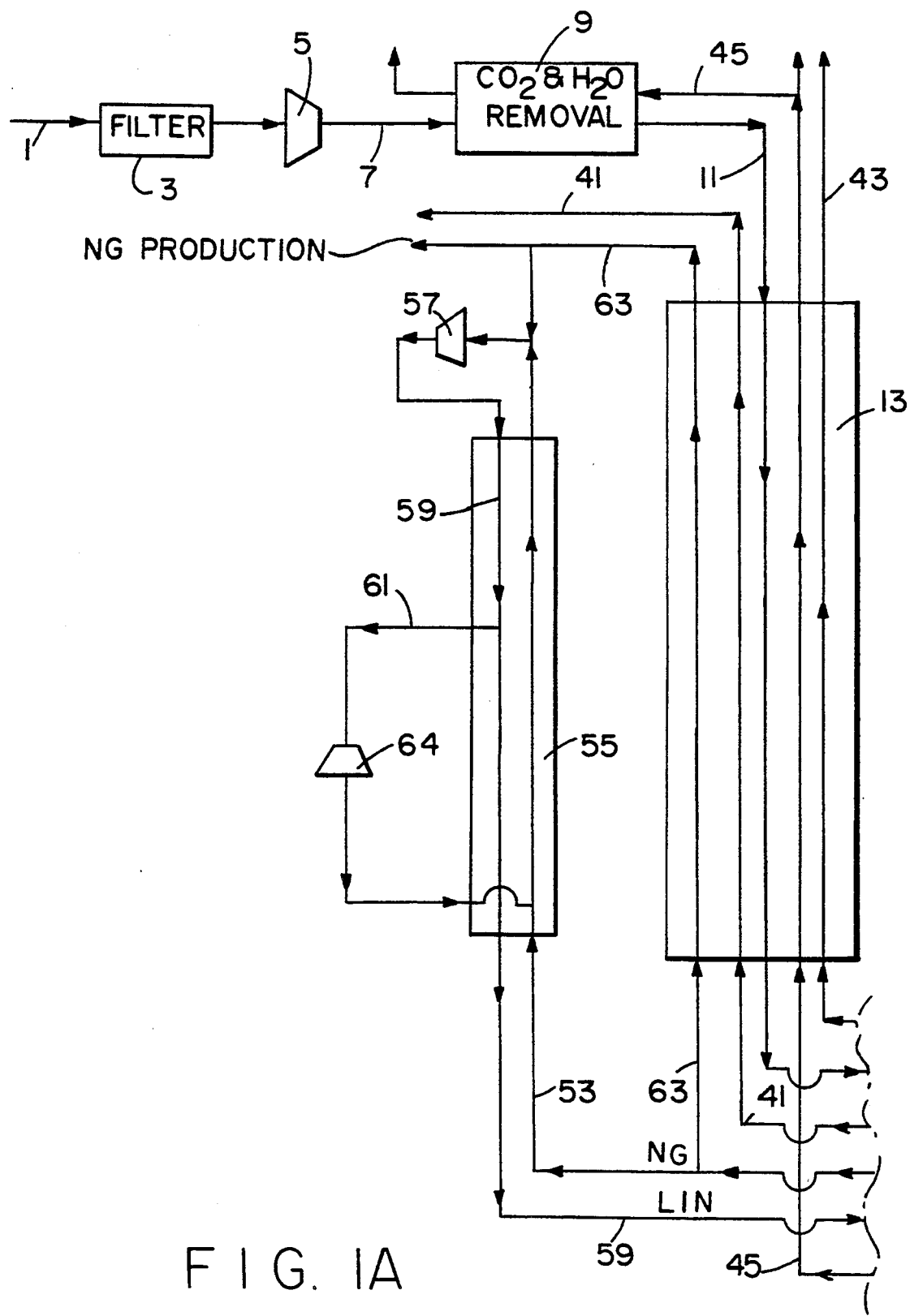
FIG. IA

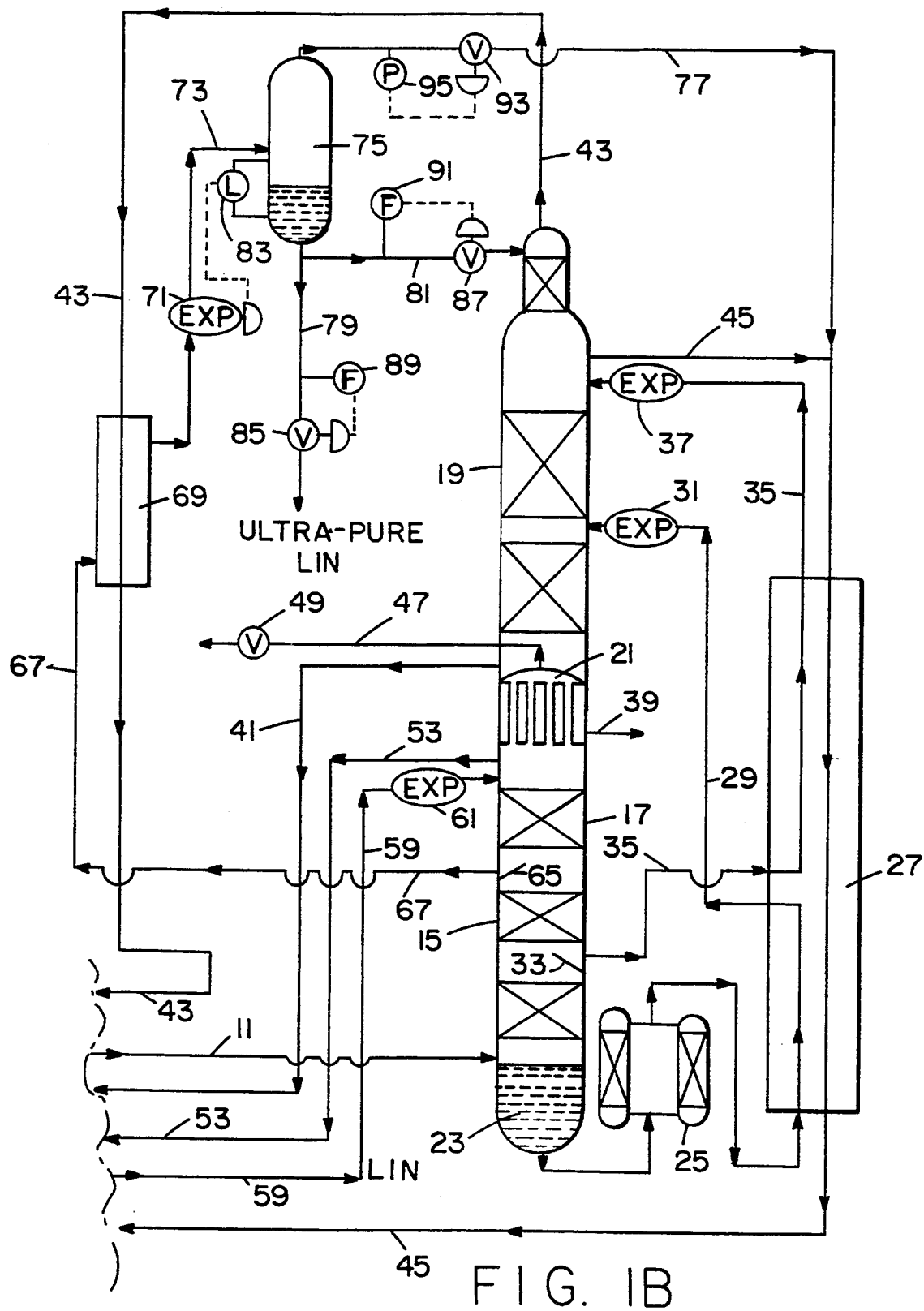
FIG. IB

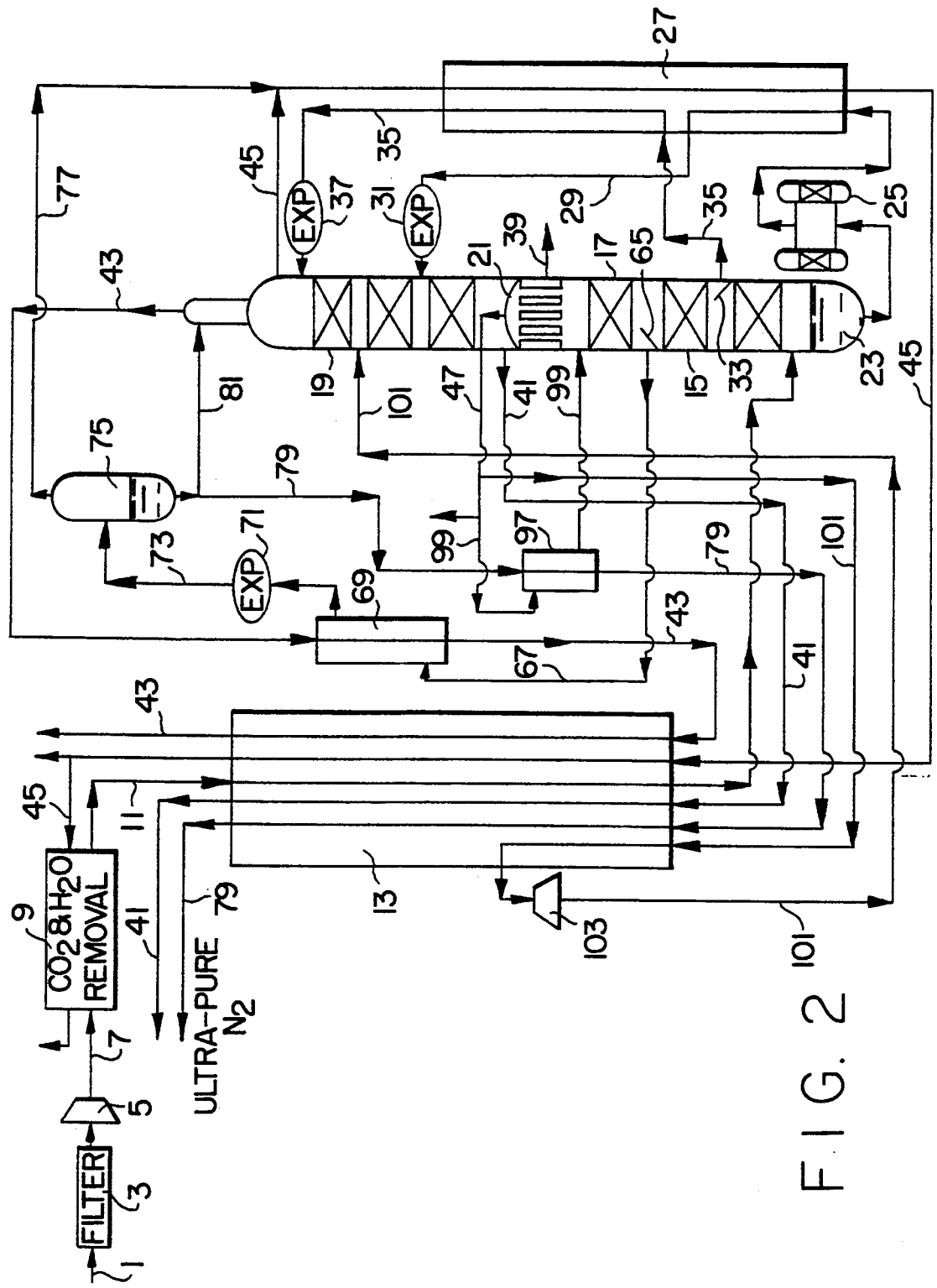
F I G. 2

METHOD AND APPARATUS FOR THE PRODUCTION OF ULTRA-HIGH PURITY NITROGEN

FIELD OF THE INVENTION

The present invention relates to a method and an apparatus for manufacturing ultra-high purity nitrogen containing only traces of low boiling point substances such as hydrogen, helium and neon. Such ultra-high purity nitrogen is of particular use in semi-conductor manufacturing processes and the like.

BACKGROUND OF THE INVENTION

It has heretofore been proposed to produce ultra-high purity nitrogen in an air separation cycle by separating nitrogen from air and condensing the nitrogen. Uncondensed gas is discharged and contains large quantities of low boiling point substances. The liquid nitrogen containing reduced quantities of the low boiling point substances is introduced as reflux to the top of a fractionating column, and a large part of the liquid nitrogen introduced as reflux is removed from the column front a fractionating plate located several plates below the top plate of the column.

The nitrogen product thus produced has progressively reduced quantities of low boiling point substances, the lower is the fractionating plate from which the liquid nitrogen introduced as reflux is taken. However, this technique has the disadvantage that oxygen, which of course is a somewhat higher boiling point substance, tends to remain as an impurity in the nitrogen product; and the degree of purity of the nitrogen thus suffers.

OBJECTS OF THE INVENTION

It is an object of the present invention to improve the degree of purity of ultra pure liquid nitrogen produced by the fractionation of air.

Another object of the present invention is to provide a method and an apparatus for producing ultra-high purity nitrogen, free from undesirable quantities of oxygen.

Finally, it is an object of the present invention to provide a method for producing ultra-high purity nitrogen, which will be easy and reliable to practice and an apparatus for the same purpose which will be relatively inexpensive to produce and operate and reliable in use.

SUMMARY OF THE INVENTION

The above objects of the present invention are achieved according to the present invention by providing a two-stage air separation process comprising a relatively high pressure stage from which the bottoms product is fed to the relatively low pressure stage as feed (in the present specification, these two stages will be referred to respectively as "high pressure" and "low pressure" for simplicity, it being understood that the respective pressures are "high" and "low" only relative to each other).

The liquid collecting in the bottom of the low pressure stage cools a condenser at the top of the high pressure stage. Gas which is not condensed in the condenser is removed from the cycle to remove low boiling point substances contained therein. Part of the liquid nitrogen in the high pressure stage is removed from a fractionating plate several plates below the top plate in the high pressure stage; and this liquid is subcooled and expanded, thereby to separate almost all of the remaining low boiling point substances. The liquid remaining after this expansion is the ultra-high purity liquid nitrogen product of the present invention.

Additional refrigeration is supplied to the high pressure stage by removing a portion of the liquid condensed in the condenser, compressing it, expanding it and heat exchanging it against itself, and then expanding and returning the liquid as reflux to the top of the high pressure stage.

BRIEF DESCRIPTION OF THE DRAWINGS

The above and other objects and advantages of the present invention will become apparent from a consideration of the following description, taken in connection with the accompanying drawings, in which:

FIGS. 1A and 1B are a single figure which is separated onto two sheets, showing schematically an air separation cycle including provision for the production of ultra-high purity nitrogen according to the present invention; and FIG. 2 is a view similar to FIGS. 1A and 1B, but showing a modified embodiment of the invention.

DETAILED DESCRIPTION OF THE INVENTION

Referring now to the drawings in greater detail, and first to the embodiment of FIGS. 1A and 1B, there is shown an air separation cycle in which air is supplied via conduit 1 and passed through a filter 3 wherein it is stripped of dust. The air is then compressed in a compressor 5 to a pressure of about 5 kg/cm$^2$ gauge. The compressed air then proceeds through conduit 7 to a unit 9 wherein it is cooled and dried and carbon dioxide is removed. The air then proceeds through conduit 11 to a main heat exchanger 13 wherein it is cooled to a temperature close to its liquefaction point and then fed to the high pressure stage of a dual pressure air separation column 17 whose low pressure stage 19 is in heat exchange relationship at its lower end with high pressure stage 15 via condenser 21.

According to a preferred embodiment of the invention, major portions of carbon monoxide and hydrogen in the raw material air are oxidized to form carbon dioxide and water, which are further eliminated in the $CO_2$ and $H_2O$ removal unit 9.

As is conventional, an oxygen-rich liquid 23 collects in the bottom of high pressure stage 15 and is fed through switching filters 25 in which solidified hydrocarbons are filtered out to prevent explosion, and then fed to the warm end of a subcooler 27 in which the liquid 23 is cooled below its boiling point and fed through conduit 29 to a Joule-Thomson expander 31 in which it is expanded to the pressure of low pressure stage 19 which, as is conventional, is a little above atmospheric pressure. This expanded material, part in vapor phase and part in liquid phase, is fed into low pressure stage 19 at an intermediate point along the vertical extent of the fractionating plates therein.

Another liquid stream from high pressure stage 15 is collected on shelf 33 a few plates above sump liquid 23 and is fed via conduit 35 to an appropriate temperature level in subcooler 27, and is subcooled and then expanded in Joule-Thomson expander 37 and is fed largely in liquid phase as reflux into low pressure stage 19 adjacent the head thereof.

In low pressure stage 19, as is conventional, a liquid oxygen product can be removed front the bottom of the stage through conduit 39. A gaseous oxygen product can be removed at the bottom of the low pressure stage but above the liquid therein, through conduit 41 and used to help cool exchanger 13. A gaseous nitrogen product can be removed from the head of low pressure stage 19 through conduit 43 and used to help cool exchanger 13; while further gaseous nitrogen can be removed through conduit 45 and used to cool subcooler 27 and then to help cool exchanger 13 and to cool unit 9.

A gaseous nitrogen product containing most of the low boiling impurities may be removed from the high pressure stage via conduit 47 under control of a valve 49.

Gaseous nitrogen withdrawn from the top of the high pressure column through conduit 53 is divided in two gaseous fractions. A first of these fractions passes through the conduit 63 and through the heat exchanger 13 for heat exchange with the other streams through said heat exchanger 13. The second of these fractions passes through the conduit 53 and through the heat exchanger 55. These two fractions are combined at the warm ends of their respective heat exchangers and are sent to the compressor 57, then to the heat exchanger 55 through the conduit 59, and thus are cooled. A portion of the nitrogen in conduit 59 is withdrawn at an intermediate temperature in the conduit 61, isentropically expanded in the isentropic expander 64 to the pressure in conduit 53, and mixed at the cold end of the heat exchanger 55 with the fluid of the conduit 53. A portion of the first fraction is withdrawn as nitrogen gas production. The heat exchanger 55 liquefies the unexpanded nitrogen fraction in the conduit 59, which is sent back to the column through the expansion valve 61. The work expander 64 provides the necessary cold for heat exchange equilibrium in the heat exchanger 55.

The nitrogen destined to be the ultra-high purity nitrogen product of the present invention is collected on a shelf 65 in high pressure stage 15, several plates above shelf 33 but also several plates below shelf 51 and hence at a vertically intermediate point along the vertical series of fractionation plates within high pressure stage 15, but nearer the top thereof than the bottom. This liquid nitrogen, largely freed from the low boiling point impurities that are removed through conduit 47, is withdrawn from high pressure stage 15 via conduit 67 and subcooled in subcooler 69 in heat exchange with the nitrogen removed from the head of low pressure stage 19 via conduit 43. This subcooled liquid is expanded in a Joule-Thomson expander 71 so that substantially all of the remaining low pressure impurities are flashed off. The mixed liquid and gas thus produced is fed via conduit 73 to a phase separator 75 in the bottom of which the ultra-high purity liquid nitrogen product of the present invention collects by gravity.

The gas separated in separator 75, containing almost all the rest of the low boiling impurities, proceeds through conduit 77 whence it joins the nitrogen gas in conduit 45 to help cool subcooler 27, etc.

The ultra-high purity liquid nitrogen product is withdrawn from the cycle to storage (not shown) via conduit 79. A portion can be diverted through conduit 81 to reflux the very top of low pressure stage 19.

In order to maintain the production of ultra-high purity liquid nitrogen at a constant rate, various flow controls are imposed. A liquid level sensor 83 continuously monitors the liquid level in separator 75 and appropriately controls expander 71. Valves 85 and 87 in conduits 79 and 81 respectively are controlled by flow sensors 89 and 91, respectively, to control the flow in the respective conduits 79 and 81. A control valve 93 in conduit 77 is controlled responsive to a pressure sensor 95 according to the pressure in conduit 77.

To illustrate the content in low boiling impurities at various points in the cycle, let it be assumed that the air fed at 1 contains 5,000 parts per billion by volume (ppb) of helium, 500 ppb hydrogen and 15,000 ppb neon. The liquid 23 rich in oxygen at the base of the high pressure stage may contain 20 ppb helium, 10 ppb hydrogen and 400 ppb neon. The gaseous nitrogen product leaving via conduit 43 may contain 1,000 ppb total of low boiling impurities. Most of the low boiling impurities leave condensers 21 in the nitrogen that leaves condenser 21 via conduit 47, in an amount of 0.1–2.0% by volume.

The liquid removed from shelf 51 via conduit 53 may contain 200,000 ppb total impurities; but this has dropped dramatically to 350 ppb total impurities in the liquid removed from shelf 65 via 67, which is ultimately to constitute the ultra-high purity nitrogen.

Most of these low boiling impurities leave phase separator 75 via conduit 77, so that the liquid product removed from phase separator 75 via conduit 79, which is the ultimate ultra-high purity liquid nitrogen product of the present invention, contains only 10 ppb total impurities, of which the sum of helium and hydrogen is only 0.3 ppb, balance essentially neon.

In a modification of the above cycle (not shown), it is possible to reduce the amount of hydrogen with which the cycle must deal, by providing, in place of the unit 9, a pair of units in series. The first of these series units can be a converter filled with an oxidation reaction catalyst such as platinum or palladium, to oxidize carbon monoxide and hydrogen in the feed air. The second unit which is next encountered is a cooling, carbon removing, drying and hydrogen occluding unit wherein the air is cooled and stripped of carbon dioxide gas and moisture, and unreacted hydrogen is occluded which has not been removed in the preceding unit.

According to this modification, the quantities of helium and neon dealt with above remain unchanged, but the hydrogen entering the system is reduced, from about 500 ppb in the previously-described embodiment, to about 1 ppb. As a result, the liquid 23 at the bottom of the high pressure stage will contain substantially no hydrogen and the total of low boiling point substances removed from shelf 65 through conduit 67, instead of 350 ppb, will be about 330 ppb.

The ultra-high purity liquid nitrogen product, instead of containing a total of 0.3 ppb helium plus hydrogen as in the preceding embodiment, will now contain about 0.05 ppb helium and about 0 hydrogen.

In the embodiment of FIG. 2, like or corresponding parts are indicated by the same reference numerals as in FIGS. 1A and 1B, but the pressure and flow rate and liquid level controls are omitted for clarity of illustration. This embodiment differs principally from that of FIGS. 1A and 1B as to the following features:

1. The ultra-high purity liquid nitrogen in conduit 79 is used to cool a heat exchanger 97. A portion of the nitrogen withdrawn from high pressure stage 17 via conduit 47 is directed via conduit 99 through exchanger 97 and is cooled and at least partially condensed therein, and then is fed as reflux to the top of high pressure stage 17.

2. Still another portion of the nitrogen in conduit 47 is withdrawn through conduit 101 and supplied to the cold end of exchanger 13, and is withdrawn from exchanger 13 intermediate the length thereof and expanded isentropically in an expansion engine 103, thereby partially to liquify the same, and is then fed to low pressure stage 19 at an appropriate level therein, i.e. intermediate the height thereof, above conduit 29 but below conduit 35.

In view of the foregoing, therefore, it will be seen that all of the initially recited objects of the invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. In a method for separating air by low temperature liquefaction and fractionation wherein feed air is compressed and cooled and supplied to a high pressure stage of a two-stage fractionation column from the bottom of the high pressure stage of which liquid is expanded and introduced at an intermediate level of a low pressure stage of the column and a gaseous nitrogen product is removed from the top of the high pressure stage, and wherein an oxygen product is removed from the bottom of the low pressure stage and a gaseous nitrogen product is removed from the top of the low pressure stage, both of said stages containing solid material providing solid surfaces on which mass transfer takes place to effect fractionation over a substantial vertical height in each said stage; the improvement comprising removing a liquid from said high pressure stage intermediate said height of said solid material in said high pressure stage, subcooling said removed liquid, expanding said subcooled liquid to produce a gas and a liquid, and withdrawing said liquid as ultra-high purity nitrogen.

2. A method as claimed in claim 1, and removing liquid from the top of said high pressure stage, vaporizing said liquid to a vapor, compressing said vapor, expanding a portion of said compressed vapor to provide refrigeration, imparting said refrigeration to the remainder of said compressed vapor, expanding said remainder of said compressed vapor and supplying the same to the top of said high pressure stage at least partly in liquid phase.

3. A method as claimed in claim 1, and removing a liquid from said high pressure stage intermediate said height but below the point of removal of the liquid which becomes said ultra-high purity nitrogen, and expanding the latter removed liquid and introducing the same into an upper portion of said low pressure stage at least partly in liquid phase.

4. A method as claimed in claim 1, and supplying a portion of said ultra-high purity liquid nitrogen to the top of said low pressure stage as reflux.

5. A method as claimed in claim 1, and withdrawing gaseous nitrogen from the top of the high pressure stage, cooling and at least partially condensing the last-named nitrogen by heat exchange with said liquid ultra-high purity nitrogen, and introducing said at least partially condensed nitrogen into an tipper portion of said high pressure stage.

6. A method as claimed in claim 1, and withdrawing gaseous nitrogen from the top of said high pressure stage, warming the thus-withdrawn nitrogen in heat exchange with feed air, expanding the thus-warmed nitrogen to the pressure of the low pressure stage, and introducing the thus-expanded nitrogen into the low pressure stage intermediate said height thereof.

7. A method as claimed in claim 1, and removing hydrogen and carbon monoxide from the feed air after compression of the same.

8. Apparatus for separating air by low temperature liquefaction and fractionation wherein feed air is compressed and cooled and supplied to a high pressure stage of a two-stage fractionation column from the bottom of the high pressure stage of which liquid is expanded and introduced at an intermediate level of a low pressure stage of the column and a gaseous nitrogen product is removed from the top of the high pressure stage, and wherein an oxygen product is removed from the bottom of the low pressure stage and a gaseous nitrogen product is removed from the top of the low pressure stage, both of said stages containing solid material providing solid surfaces on which mass transfer takes place to effect fractionation over a substantial vertical height; the improvement comprising means for removing a liquid from said high pressure stage intermediate said height of said solid material in said high pressure stage, means for subcooling said removed liquid, means for expanding said subcooled liquid to produce a gas and a liquid, and means for withdrawing said liquid as ultra-high purity nitrogen.

9. Apparatus as claimed in claim 8, and means for removing liquid from the top of said high pressure stage, means for vaporizing said liquid to a vapor, means for compressing said vapor, means for expanding a portion of said compressed vapor to provide refrigeration, means for imparting said refrigeration to the remainder of said compressed vapor, and means for expanding said remainder of said compressed vapor and for supplying the same to the top of said high pressure stage at least partly in liquid phase.

10. Apparatus as claimed in claim 8, and means for removing a liquid from said high pressure stage intermediate said height but below the point of removal of the liquid which becomes said ultra-high purity nitrogen, and means for expanding the latter removed liquid and introducing the same into an upper portion of said low pressure stage at least partly in liquid phase.

11. Apparatus as claimed in claim 8, and means for supplying a portion of said ultra-high purity liquid nitrogen to the top of said low pressure stage as reflux.

12. Apparatus as claimed in claim 8, and means for withdrawing gaseous nitrogen from the top of the high pressure stage, means for cooling and at least partially condensing the last-named nitrogen by heat exchange with said liquid ultra-high purity nitrogen, and means for introducing said at least partially condensed nitrogen into an upper portion of said high pressure stage.

13. Apparatus as claimed in claim 8, and means for withdrawing gaseous nitrogen from the top of said high pressure stage, means for warming the thus-withdrawn nitrogen in heat exchange with feed air, means for expanding the thus-warmed nitrogen to the pressure of the low pressure stage, and means for introducing the thus-expanded nitrogen into the low pressure stage intermediate said height thereof.

* * * * *